(12) United States Patent
Lori (10) Patent No.: US 11,199,017 B2
(45) Date of Patent: Dec. 14, 2021

(54) DYNAMIC VIBRATION DAMPING SYSTEM FOR HIGH-RISE BUILDINGS

(71) Applicant: PERMASTEELISA S.P.A., Vittorio Veneto (IT)

(72) Inventor: Guido Lori, Vittorio Veneto (IT)

(73) Assignee: PERMASTEELISA S.P.A., Vittorio Veneto (IT)

( * ) Notice: Subject to any disclaimer, the term of this patent is extended or adjusted under 35 U.S.C. 154(b) by 0 days.

(21) Appl. No.: 16/772,238

(22) PCT Filed: Dec. 13, 2018

(86) PCT No.: PCT/IT2018/050245
§ 371 (c)(1),
(2) Date: Jun. 12, 2020

(87) PCT Pub. No.: WO2019/116410
PCT Pub. Date: Jun. 20, 2019

(65) Prior Publication Data
US 2021/0102395 A1    Apr. 8, 2021

(30) Foreign Application Priority Data
Dec. 14, 2017    (IT) .................. 102017000144655

(51) Int. Cl.
*E04H 9/02* (2006.01)
*E04B 1/98* (2006.01)
(Continued)

(52) U.S. Cl.
CPC ............ *E04H 9/0215* (2020.05); *E04B 1/98* (2013.01); *E04H 9/023* (2013.01); *F16F 7/1028* (2013.01); *F16F 7/116* (2013.01)

(58) Field of Classification Search
CPC .......... E04H 9/0215; E04H 9/02; E04H 9/028; E04H 9/0237; F16F 7/1005; F16F 15/02;
(Continued)

(56) References Cited

U.S. PATENT DOCUMENTS 3,085,657 A * 4/1963 Preis .................. F16F 7/116
188/380
4,429,496 A * 2/1984 Masri .................. E04B 1/98
248/638
(Continued)

FOREIGN PATENT DOCUMENTS

CN    101812879    8/2010
CN    102425247    4/2012
(Continued)

OTHER PUBLICATIONS

International Search Report filed in PCT/IT2018/050245 dated Aug. 4, 2019.

*Primary Examiner* — Brian E Glessner
*Assistant Examiner* — Daniel J Kenny
(74) *Attorney, Agent, or Firm* — Rankin, Hill & Clark LLP (57) ABSTRACT

The dynamic vibration damping system for a building, comprises damping units inserted in housings located in the building façades, or slabs, or partition walls. The damping units comprise a swinging mass (2) sliding horizontally in opposite directions on a swinging plane parallel to the façade or to the slab or to the partition wall when the building vibrates, horizontal springs (3) to absorb the energy generated by the movements of the swinging mass (2), and dampers (4) to damp movements of the swinging mass (2).

11 Claims, 11 Drawing Sheets

(51) Int. Cl.
*F16F 7/10* (2006.01)
*F16F 7/116* (2006.01)

(58) Field of Classification Search
CPC ... F16F 7/10; F16F 7/104; F16F 7/116; E04B 1/98
See application file for complete search history.

(56) References Cited

U.S. PATENT DOCUMENTS

| | | | | |
|---|---|---|---|---|
| 5,168,673 | A * | 12/1992 | Nemir | B64G 1/22 52/1 |
| 5,439,366 | A * | 8/1995 | Conrad | B01F 13/04 100/173 |
| 5,558,191 | A * | 9/1996 | Lai | F16F 1/387 188/379 |
| 5,564,536 | A * | 10/1996 | Lai | F16F 1/387 188/379 |
| 5,832,806 | A * | 11/1998 | Nelson | F16F 15/02 91/361 |
| 6,123,313 | A * | 9/2000 | Otsuka | E04H 9/023 248/580 |
| 6,233,884 | B1 * | 5/2001 | Tipping | E04H 9/0237 52/167.1 |
| 6,681,908 | B2 * | 1/2004 | Davis | F16F 1/12 188/380 |
| 7,707,787 | B2 * | 5/2010 | Kazama | F16F 7/104 52/167.2 |
| 10,711,859 | B2 * | 7/2020 | Mitsch | E04H 9/0215 |
| 2006/0101727 | A1 * | 5/2006 | Holgerson | G09B 19/00 52/79.1 |

FOREIGN PATENT DOCUMENTS

| | | |
|---|---|---|
| JP | 5238701 | 2/2009 |
| JP | 2015151785 | 8/2015 |
| WO | 98/12454 | 3/1998 |

* cited by examiner

Fig 1 (State of the art)

Fig 2 (State of the art)

DYNAMIC VIBRATION DAMPING SYSTEM FOR HIGH-RISE BUILDINGS

FIELD OF THE INVENTION

The present invention relates to the field of systems for dynamic damping of vibrations, especially for application in buildings.

STATE OF THE ART

Figure 1:
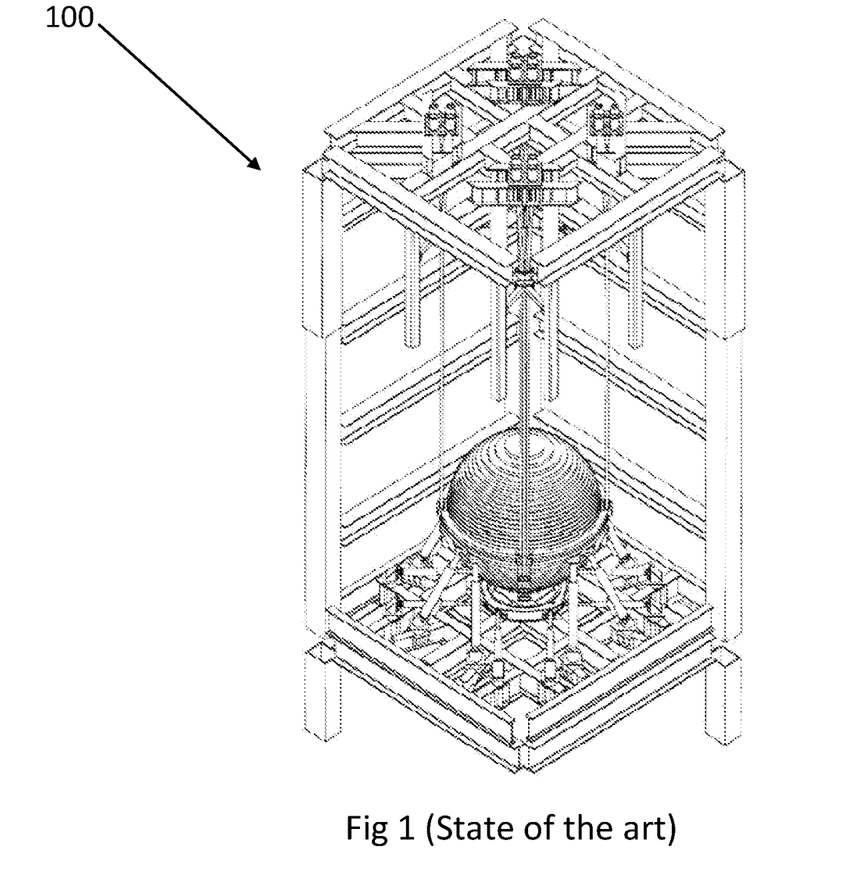
FIG. 1 shows a scheme of a damping system for a building of the state of the art.
Figure 2:
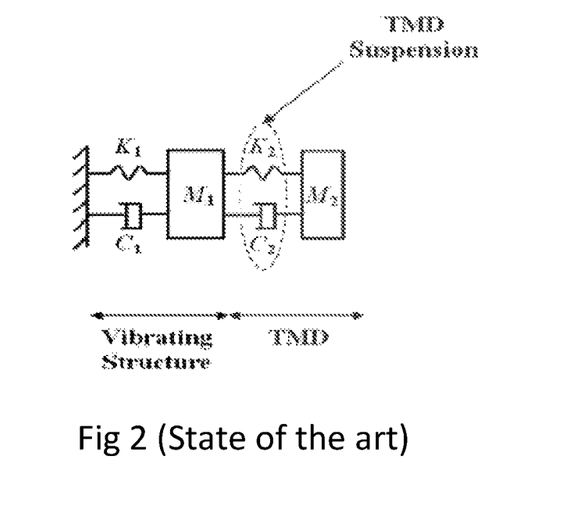
FIG. 2 shows the schematic dynamic representation of the dynamic damping system of FIG. 1.

As known in the art, the Tuned Mass Damper (TMD), which is shown schematically in FIG. 1 with reference numeral 100 and whose dynamic scheme is shown in FIG. 2, is an effective solution to reduce the vibrations of a structural mass, like a building, excited by forces with relevant energy content at the resonance frequency of the global mass system. The TMD consists of a secondary mass, having the precise stiffness to tune the TMD natural frequency to the critical resonance frequency of the vibrating primary system. In this manner the frequency response of the global mass system with two degrees of freedom at the primary natural frequency is reduced with respect to the vibrating primary system response in isolation, by means of an effect comparable to an effective source of structural damping. However this effect in reality is produced by an inertial action of the secondary mass, which vibrates in phase opposition to the vibrating primary system. One of the most important applications of the TMD is for damping wind induced vibrations in tall buildings. In particular the TMD is effective in solving comfort issues due to large peaks of accelerations under weekly or monthly wind and up to very large return periods. Several buildings in the world have been equipped with masses weighing hundreds of tons at the top of the building, achieving a reduction of the acceleration of the building up to 60%. A main disadvantage of this system is its large dimension which occupies a big part of the top of a building, which generally is a space commercially very valuable and interesting for buyers.

Another drawback is that the calibration of that system is important to avoid worse performance if the target frequency of the damping system is slightly missed.

SUMMARY OF THE INVENTION

It is therefore the main purpose of the invention to provide a vibration damping system for high buildings that needs less capital investment, has a more sustainable mass distribution and occupies less space. These and other aims are achieved by means of a dynamic vibration damping system for a building having a height greater than 100 m, which according to claim 1 comprises a plurality of damping units adapted to be inserted in respective housings located in one or more façades, or in one or more slabs, or in one or more partition walls of said building, or in a combination thereof, each of the plurality of damping units comprising a swinging mass adapted to move horizontally in opposite directions on a respective swinging plane parallel either to a building façade or a building slab or a partition wall when the building vibrates, one or more horizontal springs fixed to the swinging mass to absorb the energy generated by the movements of the swinging mass, one or more dampers fixed to the swinging mass able to damp movements of the swinging mass.

The solution according to the invention thus uses a large number of small swinging masses distributed at selected locations on the facade of the building or in its slabs, very advantageously in slabs comprising floating floors, or in partition walls, or a combination thereof, instead of a very limited number of vibration absorbing masses, in the order of one or two placed inside the top of the building, like that shown in FIG. 1, thus taking away valuable space useful for making flats or penthouses. When the swinging masses are located in facade units they are preferably located on the upper floors of the building, and occupying approximately one third of the total facade surface of a building. When the swinging masses are located in the floating floors, they are preferably located horizontally under the floating floors.

In this manner the global secondary mass corresponding to the sum of the swinging masses is sufficient to achieve a significant reduction of the acceleration of a tall building when a disturbing force is applied. In one of the most promising configurations, the weight of each swinging mass in each facade unit is comprised in the range of 75 to about 270 kg or even up to 300 kg, so as to have the cumulative mass of the dynamic vibration damping damper system equal to about 0.1-0.2% of the building weight. Each damping unit comprising a spring, a damper and a swinging mass is advantageously housed in the spandrel area of the respective facade unit, a place which is normally an opaque area of the façade. As façade it is usually understood both the side facing the external of the building and the side facing the internal of the building of the vertical perimetric wall of a building. The damping units could be also integrated totally in the area of the facade dedicated to the windows, thus contributing to give a unique aesthetical appearance to the building, if the swinging masses have a specific design, or alternatively the swinging masses can be partly distributed in the spandrel area and in the vision area of the building, depending on design choices.

The potential of the facade integrated dynamic vibration damping system is strongly dependent on the specific application and then it should be properly calibrated after the building design has been defined.

Sensitivity analysis made on existing buildings shows that the dynamic vibration damping system integrated in a facade according to the invention can be more profitable than a known TMD system, if construction costs and income from additional available rental area are also taken into account, because the advantage of the dynamic vibration damping system over a TMD of the known art is that valuable rental area of the building, corresponding to the top 3-4 floors, is not wasted.

However, in order to achieve a total mass sufficient to produce the tuned mass damper effect, also lower floors with smaller efficiency must be used, and a loss of efficiency occurs due to the smaller shape factor (i.e. a participation factor, calculated as the square of the ratio between the modal displacement at any height of the building over the modal displacement at the top of the building). At floor levels below the top of the building, the shape function is lower than one and still smaller as the floor level reduces, while the position at the top of the building has always shape factor one, as the building displacement is maximum at the top.

Without going out of the scope of the claimed invention the swinging masses can be placed in other parts integrated in a building and suitable to house them.

BRIEF DESCRIPTION OF THE DRAWINGS

Further aspects and advantages of this invention will become apparent from the following detailed description of preferred embodiments thereof, with reference to the accompanying figures, where.

DESCRIPTION OF PREFERRED EMBODIMENTS OF THE INVENTION

The invention will be better understood by reading hereafter the description of preferred embodiments of a dynamic vibration damping device according to the invention.

Figure 3A:
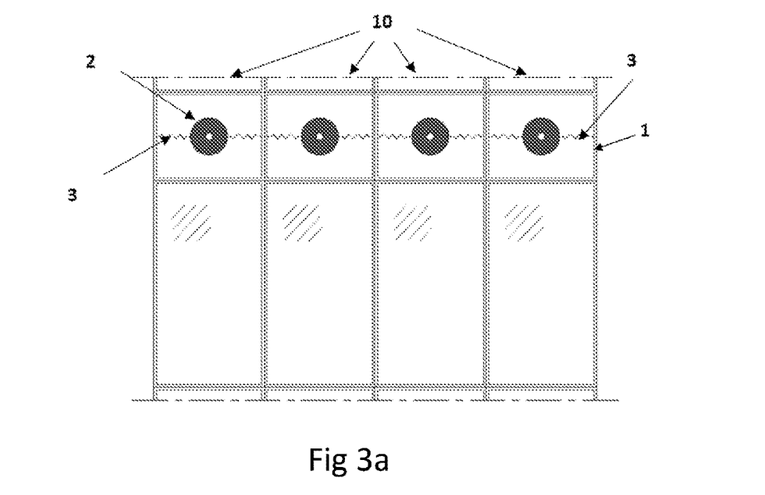
FIG. 3a shows a schematic front view of a detail of a dynamic vibration damping system of the invention located in a facade.
Figure 3B:
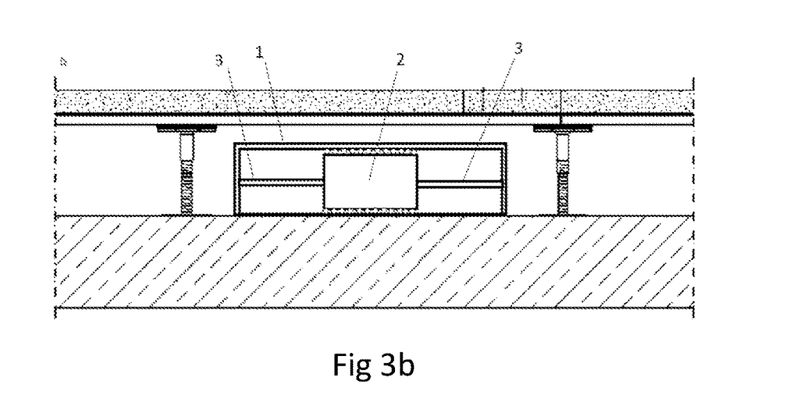
FIG. 3b shows a schematic section view of a detail of a dynamic vibration damping system of the invention located in a slab of a building.
Figure 3C:
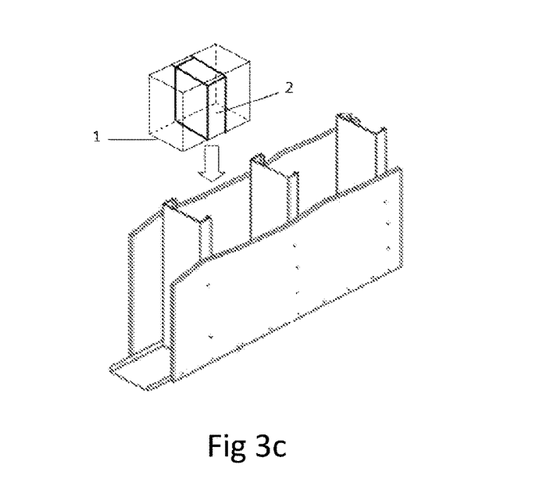
FIG. 3c shows a schematic axonometric view of a detail of a dynamic vibration damping system of the invention located inside a partition wall.
Figure 4:
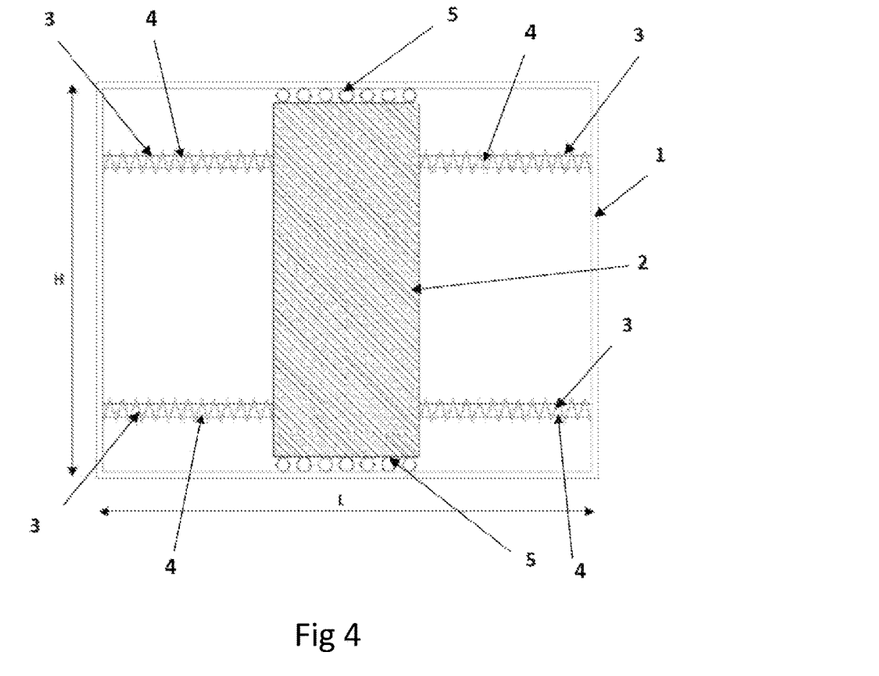
FIG. 4 shows a schematic front view of a damping unit belonging to the dynamic vibration damping system of the invention.
Figure 5:
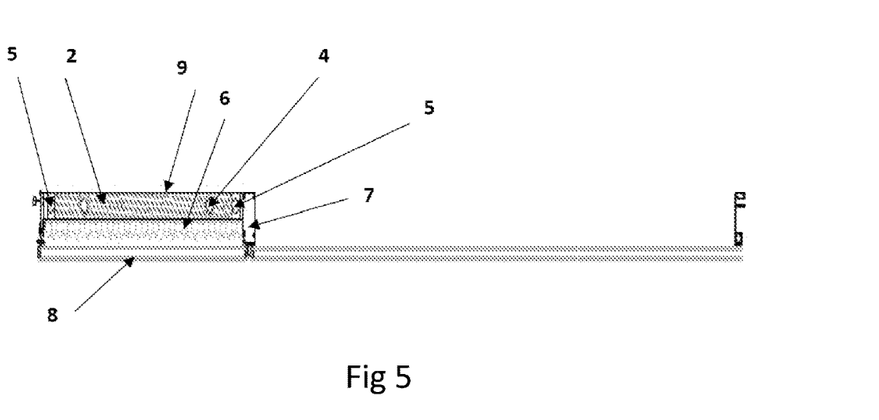
FIG. 5 shows a schematic longitudinal section of a damping unit belonging to the dynamic vibration damping system of the invention.

With reference to FIGS. 3a and 4, there is shown schematically a portion of a building facade with four facade units 10 having each a respective damping unit belonging to the dynamic vibration damping system of the invention integrated in one façade unit 10 and comprising a steel frame 1, a swinging mass 2 made of steel or heavy concrete block, horizontal springs 3, generally in number of four, four horizontal dampers 4 of known type and two rails 5, or sliding guides, which allow a horizontal relative shifting of the swinging mass 2 in relation to the frame in two opposing directions.

The width L of the damping unit is determined by the distance between the mullions, and is dependent on each project. The height H of the damping unit is determined by the distance between upper transom and intermediate transom, and is dependent on each project. The damping unit is preferably integrated in the facade unit curtain wall 7 and is preferably placed in the spandrel area so as not to disturb the visual appearance of the curtain wall. In the spandrel area the damping unit is placed e.g. behind the spandrel glass 8 and the insulation panel 6 when provided, at the internal part of the curtain wall, to be easily accessible from inside for maintenance operations or refinement. The damping units are advantageously covered from the internal side by means of an aluminum plate 9, which can be opened in case of maintenance/refinement of the damping devices. The width L of the curtain wall is large enough to accommodate the movement of the swinging mass 2. The height H of the spandrel area and the gap D in the spandrel area between insulation unit 8 and aluminum plate 9 is sufficient to accommodate the mass of the devices and the rail system along which the swinging mass 2 can move.

Figure 6:
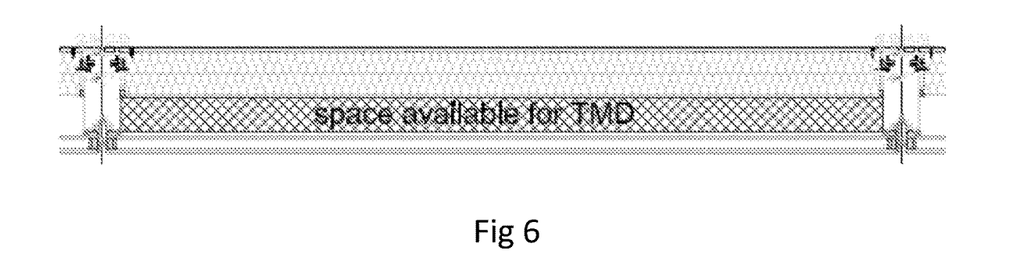
FIG. 6 shows a transversal section of a spandrel area of a façade unit of a building where a damping unit belonging to the dynamic vibration damping system of the invention, FIG. 7 A, B, C shows three variants of the damping unit belonging to the dynamic vibration damping system of the invention.

In another embodiment of the invention, as shown by the horizontal cross section of the FIG. 6, in order to integrate the damping units of the dynamic vibration damping system in the facade spandrel area dimensions are a width L of about 1500 mm and a depth of around 70 mm, and these dimensions also allow to design a spandrel panel of appropriate thickness to preserve the thermal and acoustic insulation performance of the facade. With regards to the height H of the spandrel, in general it ranges from 700 mm to more than 1000 mm, depending especially on specific fire resistance requirements. Taking into account tolerances for the necessary mechanisms and needed for preforming the movements, a volume of about 500 mm×700 mm×60 mm (width×height×depth) must be available for the swinging mass 2. This allows, when steel is used for making the swinging mass 2, a maximum mass weighing around 160 kg in each unit of the dynamic vibration damping system, and a lateral displacement of about ±500 mm. However these design limitations could be overcome by using a double facade unit, having 3000 mm width. In this manner for instance the maximum displacement available for the swinging masses could range from ±500 mm and even more, while the weight of the unit swinging mass could be almost doubled. Even if other adjustments can be applied by the façade designers in order to reach the specific demand for any project application, in the description of the following preferred embodiment a maximum limit for the unit swinging mass 2 of 300 kg is assumed, more advantageously of 270 kg. This limit derives from practical considerations and possible issues occurring to the facade unit and the slab design due to the large façade dead load.

Figure 7:
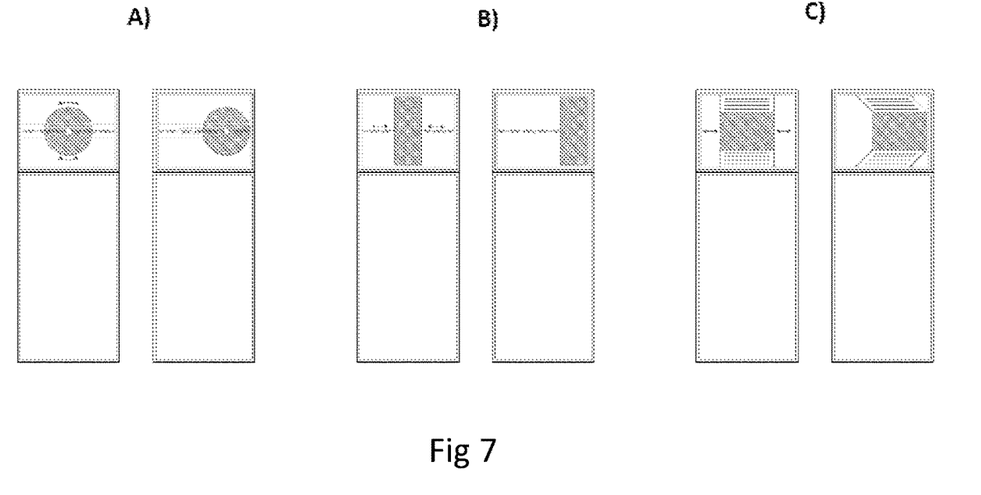

In FIG. 7 mechanisms of different shapes that can be used as swinging damping units are shown: rotational mass, translational mass driven by linear springs, translational mass driven by shear deformation of polymer or elastomer.

Detailed Description of a Damping Unit

We now describe a particularly advantageous embodiment of a damping unit which is part of a damping system of the invention.

Figure 19:
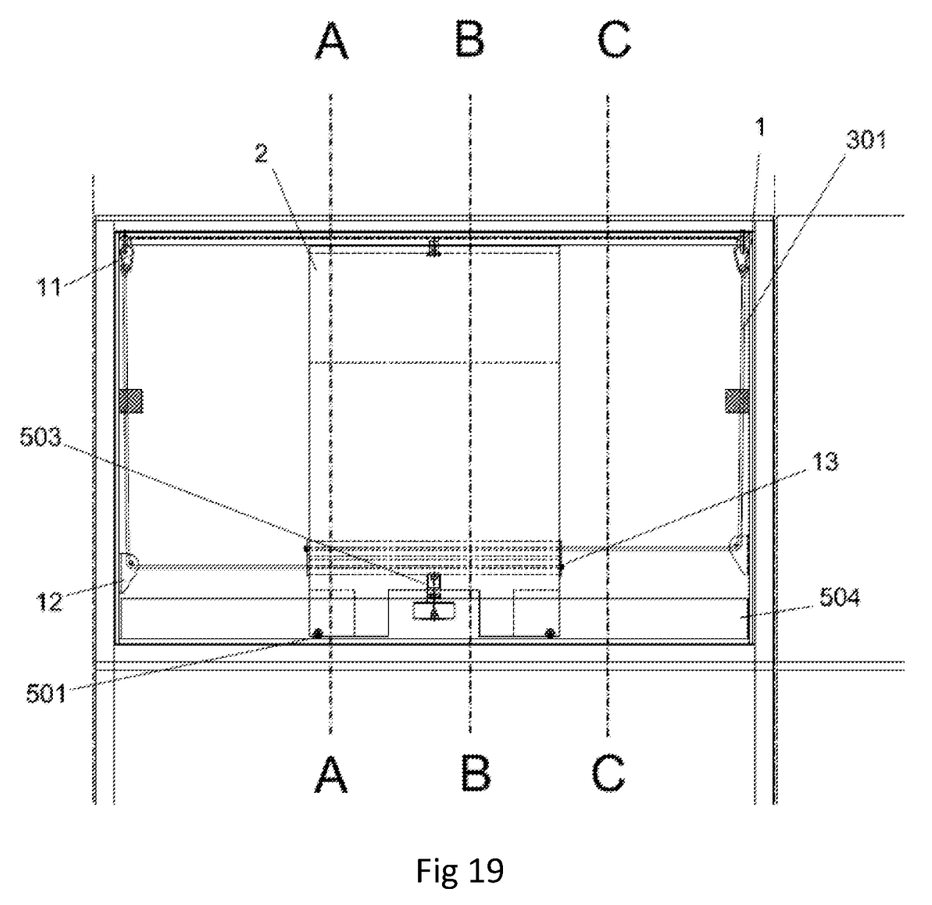
FIG. 19 shows a front view of a damping unit belonging to the dynamic vibration damping system of the invention.

With particular reference to FIG. 19 a damping unit forming a multiple tuned mass dampers (MTMD) system has a perimeter frame 1 that is comprised of a 10×80 mm rolled steel plate. The perimeter frame is screw fixed to the façade mullions and transoms. The lower transom also provides additional support for the mass self-weight. The steel weight, to form the nominal mass of 250 kg, is obtained by a basic steel casting swinging mass 2 of shape shown in FIG. 20.

Figure 20:
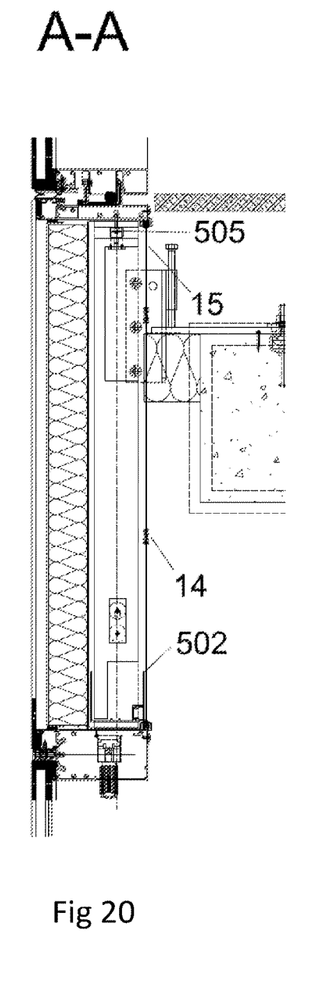
FIGS. 20, 21, 22 show three sections of the damping unit of FIG. 19 at the three vertical planes A-A, B-B, C-C.
Figure 21:
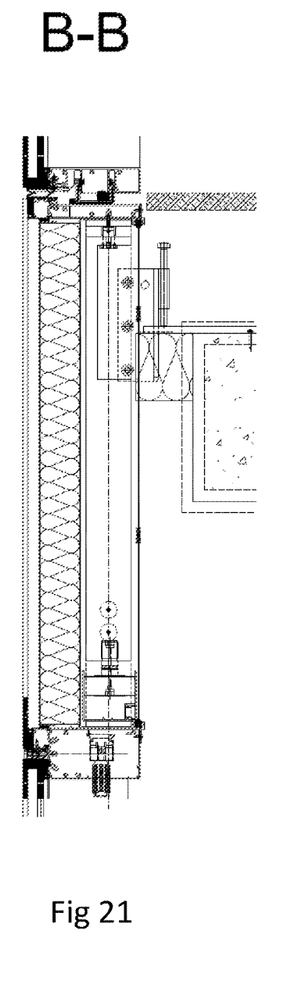
Figure 22:
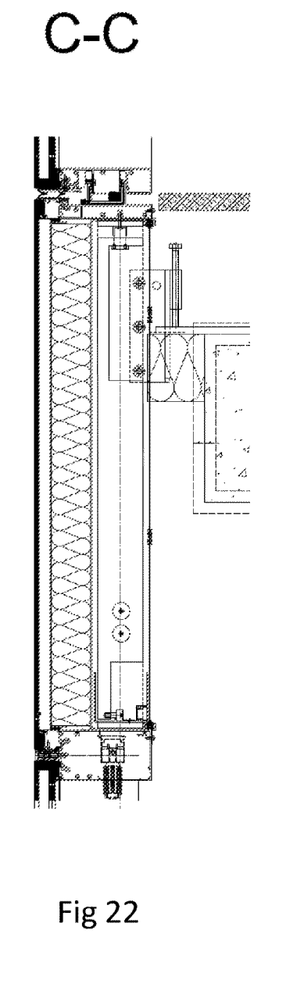

The net weight of the casting in the drawings is around 200 kg. Additional weight can be added by filling the recess visible at the top of the swinging mass 2 vertical cross section. Optimum weight is around 270 kg, and would provide a benefit of 8% for tuning options. The swinging mass 2 is supported at bottom by two roller bearings 501 allowing the swinging mass to slide with minimal friction, e.g. a nominal friction coefficient of 0.001. In addition, a roller bearing 501 is provided on the top to also reduce friction and laterally guide the swinging mass 2 in case of lateral deviations with respect to the track direction and rolling into an aluminium roll with stainless steel running board 502. A bottom guide roller bearing 503 on a guide 504 is also designed to take the weight of the steel swinging mass 2 during transportation as the damping unit will be transported horizontally to site and then lifted vertically into position. The track 505 serves as cam follower made of extruded aluminium.

As a result the weight will initially be designed to be locked into position during transport and lifting and released after final setting of the panel onto the building perimeter.

Stiffness and damping system is provided by means of two pre-stressed shock cords 301 of initial length of around 1150 mm. At this length, the shock cord may be initially pre-stressed to a level that would allow the shock cord to maintain a degree of pretension even when the mass has moved to its extreme displacement limits, ensuring that the cord will not sag and create the potential to snag. In their neutral position, the two shock cords are fixed at the opposite sides of the damping unit on the top of the swinging mass 2 by aluminium or nylon tear shaped thimble ends and carabiner end connectors 11 for quick installation and replacement if necessary. The other ends are fixed on the bottom of the swinging mass 2, given that the neutral position length is about 1550 mm through the roller guide 12, with a permanent strain of around 35%. Initial length is designed not to exhibit any slack in the chord along any possible position of the mass. Maximum oscillation distance in either direction is around 400 mm, resulting in maximum cord strain of around 70% which is less than the maximum operational strain limits of the cord of 90%. Feature 13 is a shock cord conduit and end stop.

With this design, quick access is thus provided to all the critical components especially the roller bearing by means of lower and upper hinged access 14, 15.

Some major components in this design have the following preferred, but not exclusive, dimensions and materials:

The shock cord 301 has a 6.5 mm Diameter and is of heavy duty aramid braid elastomeric material to BS SP 170-171, BS3F-70:1991, maximum extension capability: 105%, 75% extension max: 130N, min: 100N.

The connector 11 is an aluminium or nylon tear shaped thimble, double-whipped plus carabiner end connector.

The guide 12 is a shock cord nylon roller guide.

The roller bearing 501 has 19 mm diameter, a M8 bolt cam follower track runner bearings.

The perimeter frame 1 is a 10×80 mm steel plate.

The running board 502 is an extruded aluminium roll of stainless steel.

It is clear to a skilled person that such embodiment of a damping unit described for an insertion into a housing of a façade of a building can easily be adapted for use either in a slab or in a partition wall, by simply taking into account the different direction of the gravity force.

Figure 8:
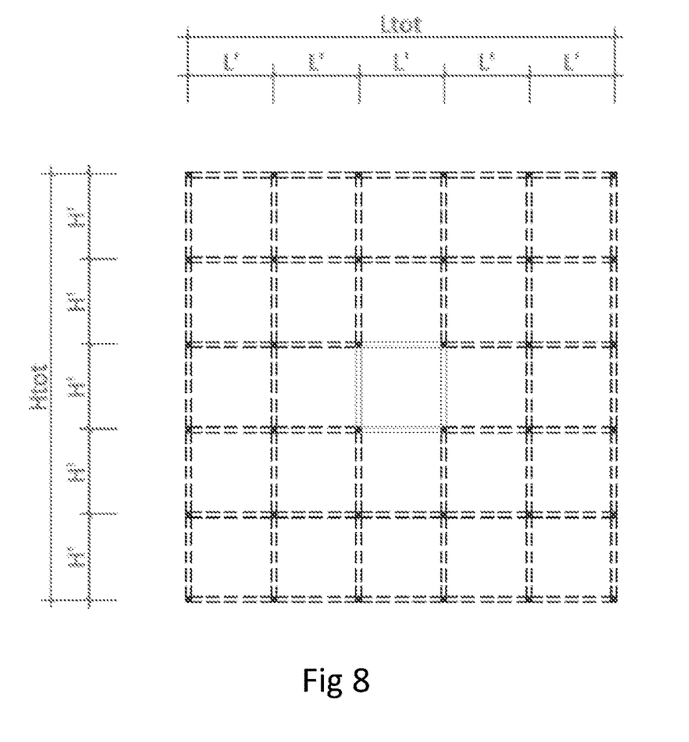
FIG. 8 shows a scheme of a building floor used for calculations of the dynamic vibration damping system of the invention.

Example of an Application of the Multiple Tuned Mass Dampers (MTMD) of the Invention The dynamic vibration damping system of the invention is calculated for an applicative example constituted by a building of 54 floors, with a structural frame made of concrete. The square section of the building is shown in FIG. 8 and it is formed by five bays, each bay spanning 9 m. The height of each floor is 4 m.

From the $1^{st}$ floor to the 18th floor the columns of the building have a cross section 1 m by 1 m, from floor 19th to 36th the cross section is 0.85×0.85 m, while from floor 37th to 54th is 0.75 m×0.75 m. The beams have all a section of 1.2 m×0.3 m and a core of 0.3 m thickness is in the central bay of the cross section. The total structural mass of the building is around 62450 tons.

A 2d FEM model of the building has been created, giving the first two natural frequencies at 0.23 Hz and 0.81 Hz. A damping ratio 1% for the structure has been assumed.

When excited by a sample of 10 minutes of wind pressure generated by a Von Karman Spectrum, with a mean value of speed 27.7 m/s and standard deviation 3.89 m/s, the acceleration time history at the top of the building has a rms at the first natural frequency of 6.88 mG and a rms at the second peak of 4.36 mG, for a total rms (full acceleration response) of 9.49 milliG. The comfort criteria according to ISO6897 (Irwin) would recommend to limit the rms at the first frequency to 4.8 mG and the rms of the second resonance component to 2.9 mG.

Figure 9:
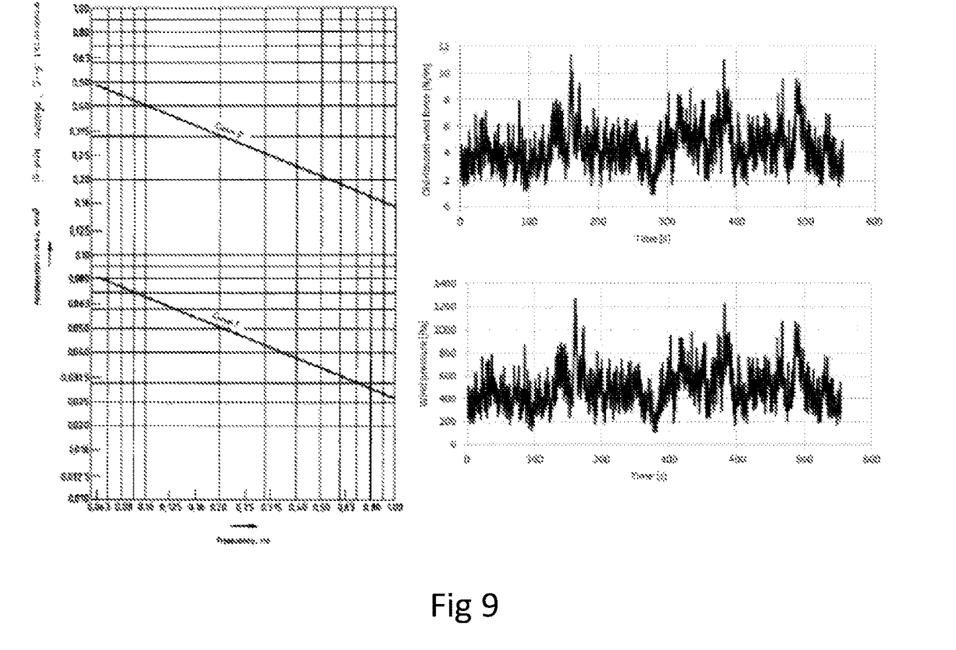
FIG. 9 shows graphs with examples of distributed wind force and pressure time history used for calculations and a chart expressing the comfort criteria adopted FIG. 10 A, B, C, D shows schemes of different tall buildings having no damping system and having damping systems used for comparative calculations.
Figure 10:
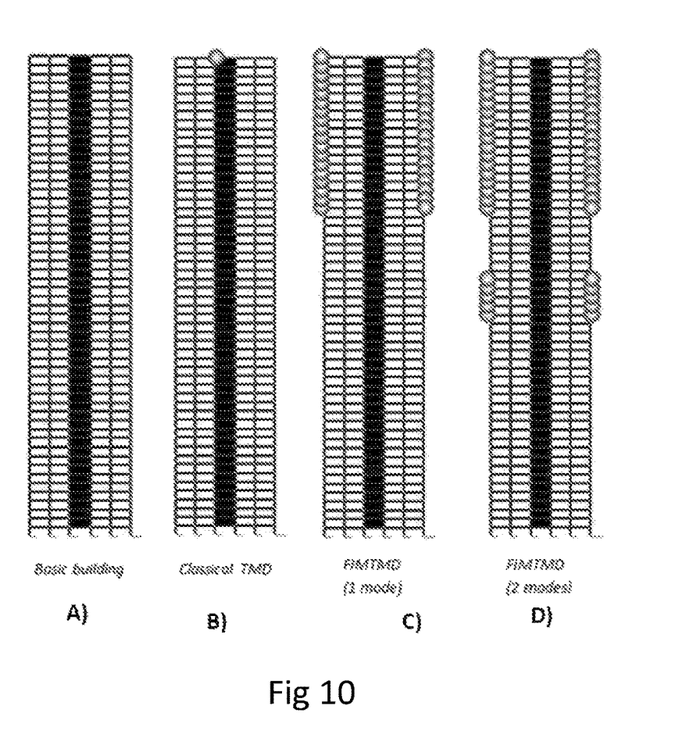
Figure 11:
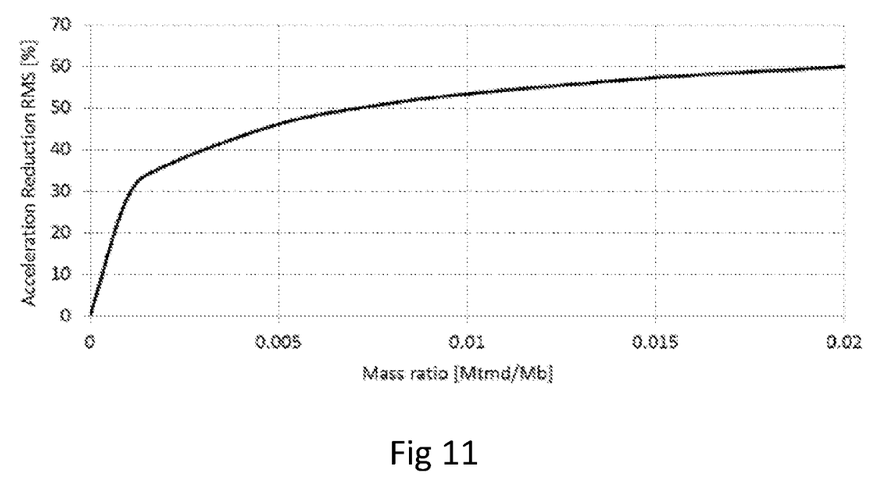
FIG. 11 shows a graph relating to acceleration percentage reduction versus mass ratio for a known TMD in the building of FIG. 10.

Using Den Hartog formulations for the calibration of the TMD in terms of stiffness and damping of the auxiliary system, the FIG. 11 can be found in terms of last floor rms acceleration reduction for the first mode versus the mass ratio for the building application of FIG. 10C under the wind time history in FIG. 9. This result is consistent with the performance of several buildings having mounted a TMD in the world, showing that the optimal application range is given by adopting for the TMD around 1% of the structural mass of the building (2.5% to 3% of the modal mass of the first mode of vibration).

Figure 12:
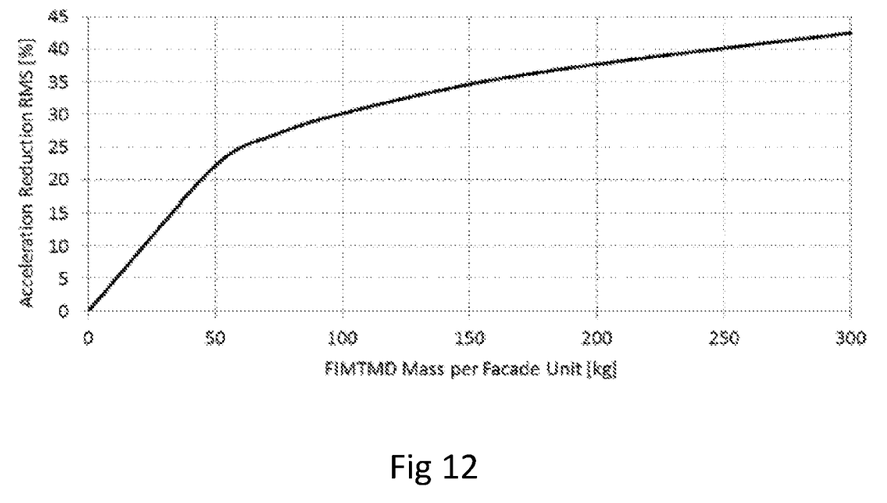
FIG. 12 shows a graph relating to acceleration percentage reduction versus façade units mass for the dynamic vibration damping system of the invention in the building of FIG. 10.

By applying the dynamic vibration damping system of the invention at the last top 18 floors of a building, corresponding to approximately to ⅓ of the height and considering a facade module of 1.5 m×4 m, the square floor section of the building shows that, when assuming the wind blowing perpendicular to one of the edges, there will be 30×2=60 facade units available for the damping units of the dynamic vibration damping system at each floor and thus in total 60×18=1080 facade units. By selecting the weight of the swinging mass between 50 to 300 kg, the curve of FIG. 12 can be obtained in terms of first mode last floor rms acceleration reduction versus mass ratio.

Figure 13:
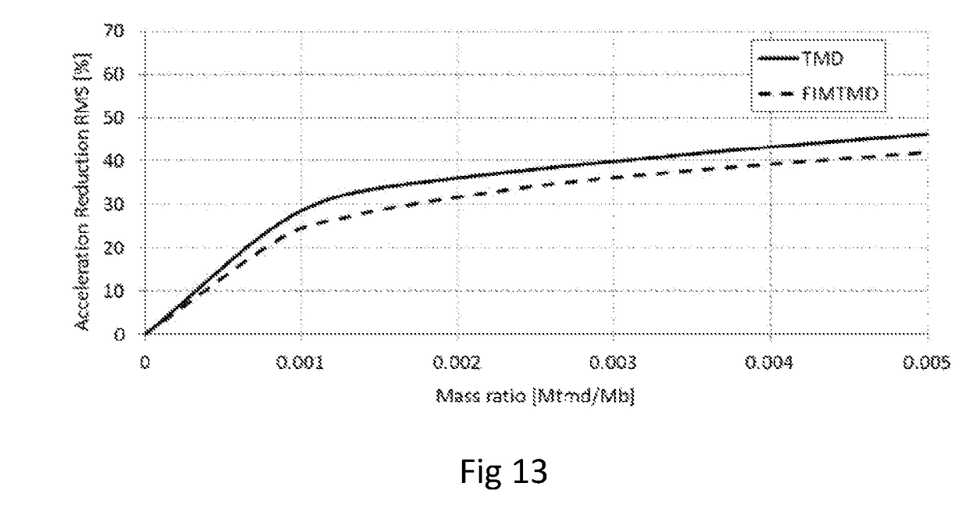
FIG. 13 shows a graph relating to acceleration percentage reduction comparison between a dynamic damper system according to the invention and a known TMD.

The graph of FIG. 13 compares the performance of the TMD with the one of the dynamic vibration damping system, showing that a loss of performance for the first mode of the dynamic vibration damping system is present, due to the distribution of the mass on the upper one third of the building height rather than at the top of the building. This loss is represented by a ratio of about 1.5 in terms of effective mass.

TABLE 1

Characteristics of the unit spring mass damper system for different mass unit choice

| Mass per facade unit [kg] | mass ratio [%] | damper stiffness [N/m] | damper damping [N · s/m] |
|---|---|---|---|
| 50 | 0.09 | 112.6 | 2 |
| 75 | 0.13 | 168.9 | 3.7 |
| 100 | 0.17 | 225 | 5.7 |
| 150 | 0.26 | 337.3 | 10.5 |
| 200 | 0.35 | 449.3 | 16 |
| 250 | 0.43 | 561 | 22.5 |
| 300 | 0.52 | 672.6 | 29.5 |

TABLE 2

Performance of the dynamic vibration damping system for different mass unit choice

| Mass per facade unit [kg] | rms total [mG] | rms mode 1 [mG] | reduction [%] | damper max disp [mm] | damper max acc [m/s2] | Equivalent damping [%] |
|---|---|---|---|---|---|---|
| 50 | 8.42 | 5.36 | 22.1 | 880 | 2 | 0.75 |
| 75 | 8.23 | 5.02 | 27.1 | 690 | 1.5 | 1 |
| 100 | 8.1 | 4.81 | 30.1 | 570 | 1.3 | 1.5 |
| 150 | 7.89 | 4.5 | 34.6 | 450 | 1 | 2.2 |
| 200 | 7.76 | 4.29 | 37.7 | 367 | 0.8 | 2.9 |
| 250 | 7.64 | 4.12 | 40.1 | 310 | 0.68 | 3.7 |
| 300 | 7.54 | 3.96 | 42.5 | 270 | 0.6 | 4.4 |

Table 1 shows the mechanical characteristics of the spring mass damper system of each facade unit according to the calibration given by Den Hartog approach and for each different choice of the unit mass. In the table 2 the corresponding performance of the dynamic vibration damping system are shown in terms of reduction of the acceleration rms, unit mass displacement and acceleration and equivalent damping added to the building.

First Embodiment: Already Designed Building

One possible application of the dynamic vibration damping system on an already designed building, e.g. when during the design phase the equivalent damping has been overestimated and during the construction it has been found a real value lower than expected. A last minute adjustment would involve huge costs, even in case a TMD is envisaged, because that would involve a significant impact on the logistic of the building construction and on the lay-out of the upper last floors of the building. On the contrary, remaking the facade design would entail only a minimal change in case the building owner would ask for this kind of "last minute specifications" and no impact would occur in terms of logistic. For this reason the dynamic vibration damping system is an appropriate solution for resolving comfort issues occurring once the building design is already in advanced stage or construction is already started. Still similar scenario is that one of a facade refurbishment for a building that during its life has experienced comfort issues due to wind.

Moreover the dynamic vibration damping system can be applied also during the building design phase by the building design team. In this case the design team could request in the façade performance specifications an additional requirement, specifying a certain percentage of critical damping to be added to the building by the façade.

Figure 17:
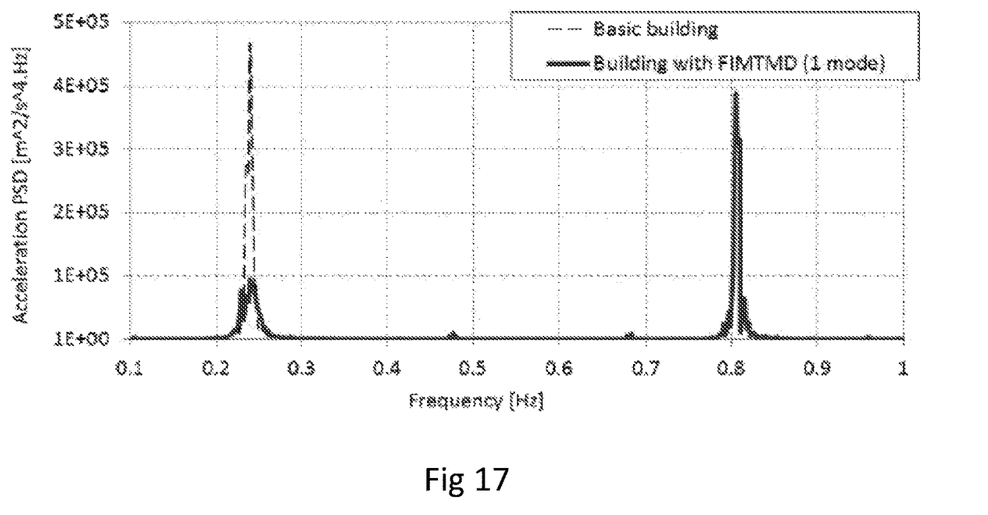
FIG. 17 shows a graph relating to power spectral densities of the acceleration at the top of the building for basic building and building enhanced with façade integrated dynamic vibration damping system of the invention working only at the first natural frequency of the building.
Figure 18:
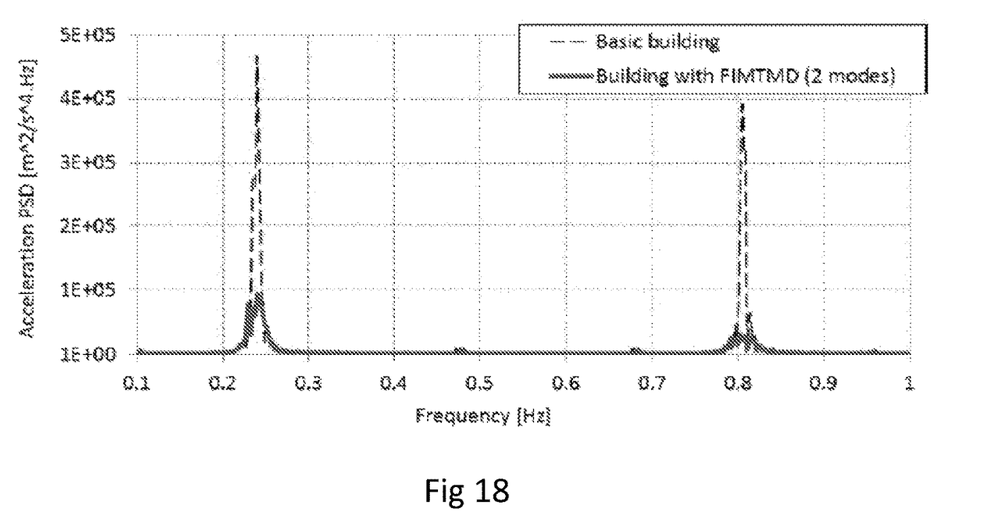
FIG. 18 shows a graph relating to power spectral densities of the acceleration at the top of the building for basic building (black) and building enhanced with façade integrated dynamic vibration damping system of the invention working at the first two natural frequencies of the building.

Also the second mode of vibration can be affected by the proposed dynamic vibration damping system, in case excessive acceleration peaks due to this second frequency mode occur in the basic building behavior. For instance FIG. 17 and FIG. 18 show the different Power Spectral Densities of the acceleration once only the first mode of vibration or both the first two natural frequencies are tuned. The simplest way to apply the second mode strategy consists of the integration of the dynamic vibration damping system also in the central floors of the elevations, as shown in the scheme of FIG. 10D. In this application example for instance the central ten floors have been considered, using the same mass values of the top ⅓ of facade, 100 kg per facade unit in the example of FIGS. 17 and 18. Obviously a lower total mass is required to damp the second mode of vibration with respect to the first one, because of the lower energy content due to the second mode in the building response. Another evidence is that the mass would displace in this case of smaller values than the masses at the top of the building, allowing the designer to find the optimal combination of unit mass and number of floors in order to achieve the required performance. The table 3 shows like both the first and second mode of vibration of the example building can be controlled within the comfort limits by using the first mode of the dynamic vibration damping system working in different areas of the building elevations.

TABLE 3

Comparison between high performance of first mode dynamic vibration damping system working at one single mode of vibration of the building with first mode dynamic vibration damping system working at the first two frequencies.

| | Mass per facade unit first mode [kg] | Mass per facade unit second mode [kg] | rms mode 1 [mG] | rms mode 2 [mG] | rms tot [mG] |
|---|---|---|---|---|---|
| Basic Building | — | — | 6.88 | 4.36 | 9.49 |
| FIMTMD 1 mode | 100 | — | 4.81 | 4.36 | 8.09 |
| FIMTMD 2 modes | 100 | 100 | 4.81 | 2.90 | 6.35 |

Figure 14:
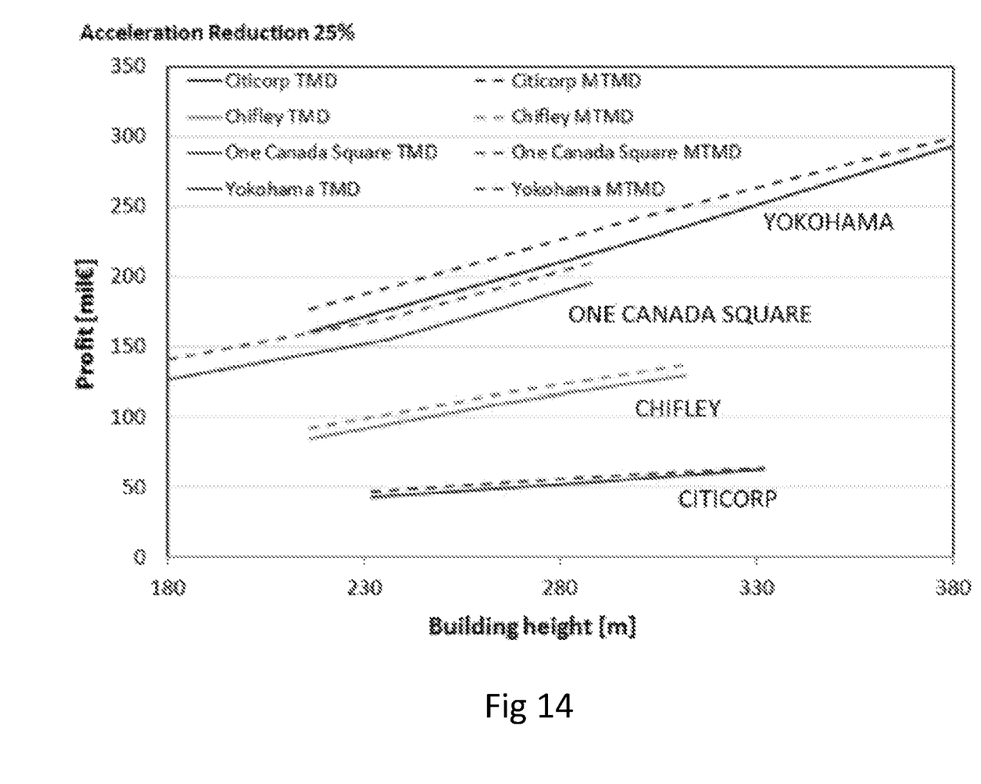
FIG. 14 shows a graph relating to the Estimated Profit of known TMD system versus façade integrated MTMD for four different building types and versus height of the building, when the target is the reduction of 25% of the acceleration.
Figure 15:
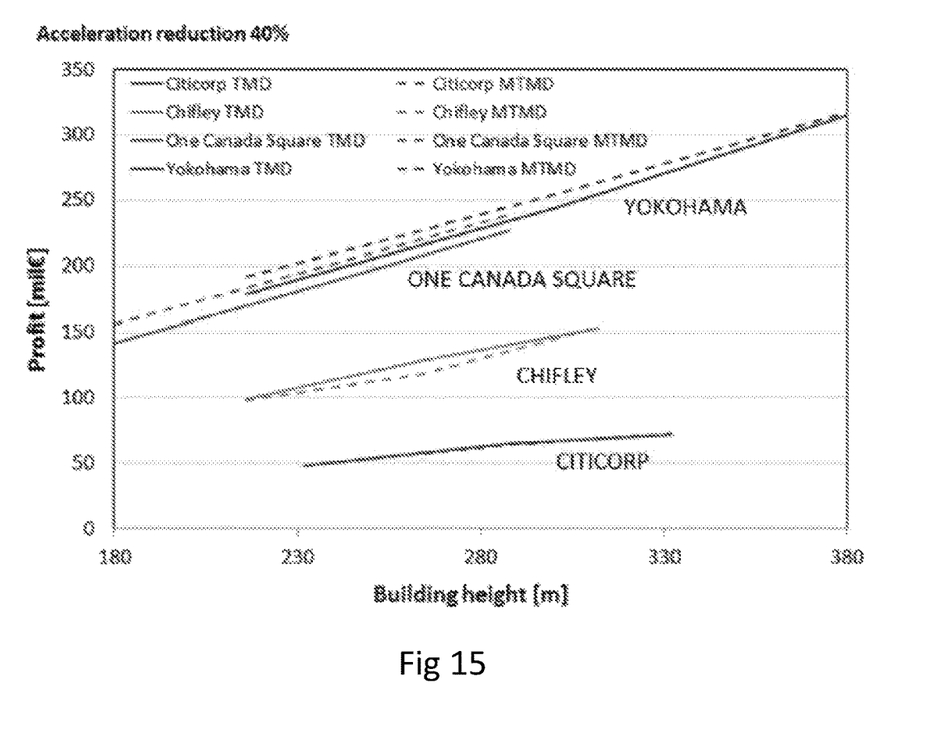
FIG. 15 shows a graph relating to the estimated Profit of known TMD system versus façade integrated dynamic system of the invention for four different building types and versus height of the building, when the target is the reduction of 40% of the acceleration.
Figure 16:
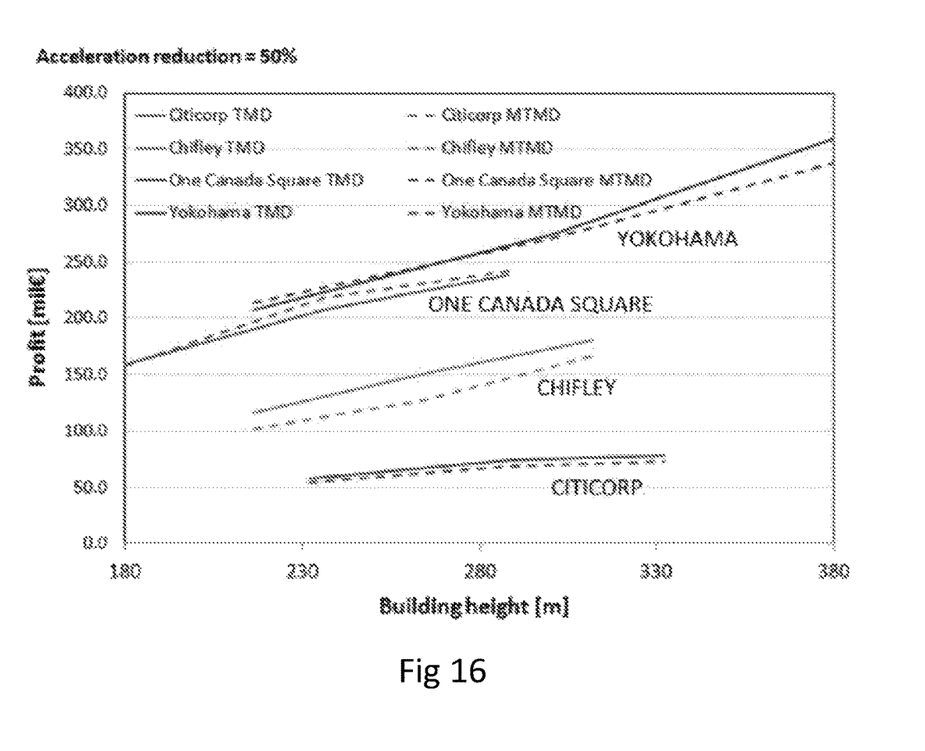
FIG. 16 shows a graph relating to estimated profit of known TMD system versus façade integrated dynamic vibration damping system of the invention for four different building types and versus height of the building, when the target is the reduction of 50% of the acceleration.

The results of another exercise are shown in the graphs of the FIGS. 14, 15 and 16. In this case four test cases have been analyzed, starting from the real frame characteristics of existing buildings equipped with TMD: Citicorp Building in New York (United States), Chifley Tower in Sydney (Australia), One Canada Square in London (United Kingdom) and Yokohama Tower in Yokohama (Japan). Their height has been fictitiously varied within a range [180 m÷380 m] in order to estimate the invention benefit trend, also considering different material, constructions costs and rental prices within the different markets. A general conclusion seems that the higher benefits occur when the dynamic vibration damping system of the invention is applied in order to achieve an acceleration mitigation of around 25%-40% and also when the building height doesn't exceed 300 m. The interpretation of this result is that for very tall building, the benefit is reduced due to the preserved rental income, mostly because of the increased number of floors involved. When the mass per unit is fixed, for instance is defined at 75 kg per damping unit, the equivalent mass of the dynamic vibration damping system is sufficient to produce a reduction of the acceleration of about 25% with respect to the basic building. On the contrary for higher demand, a strengthening of the building structure should be coupled with the dynamic vibration damping system. In this case the appropriate solution is to increase the mass per unit, at least up to the point that this is compatible with the design constraints of the facade in terms of total weights and sizes. Taking into consideration also financial feasibility, the perfect applicability of the dynamic vibration damping system integrated in a building facade is best suited for tall buildings with height comprised between 100 m and 300 m. Furthermore the possibility of installing the system on existing buildings when the building vibration can be better estimated is the other important advantage.

Another advantage of the invention is that it can be integrated on a building in the event of a facade recladding scheduled or not, if a building is found to be subjected to high peak of accelerations.

Another advantage of the facade integrated dynamic vibration damping system according to the invention is that the numerous independent swinging masses give significant redundancy to the dynamic vibration damping system, particularly useful in cases when one or more swinging masses do not work properly.

In addition, the performance of the dynamic vibration damping system according to the invention is more uniform over a wider range of frequencies, and thus the calibration of the device is not paramount like in the case of known TMD.

A not less important advantage is that no additional logistic issues are caused by integrating the damping adjustment plan into the building plan. The dynamic vibration damping system is implemented together with the facade, which is a component already present in the design, and thus no design complication is introduced in the initial plan.

The demand for a minimum equivalent damping can be in the future one of the specified performances of the facade for high rise buildings, together with the already well established performance in terms of thermal and acoustic comfort and insulation. After the building design is ready, the facade contractor can easily integrate the single mechanism in the façade unit, providing it with a post-fabrication system for late calibration and adjustment of stiffness and damping.

The invention claimed is:

1. A dynamic vibration damping system for a building having a height greater than 100 m, the dynamic vibration damping system comprising:
a plurality of damping units adapted to be inserted in respective housings located in one or more façades, or in one or more slabs, or in one or more partition walls of said building, or in a combination thereof, each of the plurality of damping units comprising a swinging mass adapted to move horizontally in opposite directions on a respective swinging plane parallel either to a building façade or a building slab or a partition wall when the building vibrates, one or more horizontal springs fixed to the swinging mass to absorb energy generated by the movements of the swinging mass, one or more dampers fixed to the swinging mass able to damp movements of the swinging mass, wherein the weight of the swinging mass is comprised in the range of 150 kg to 300 kg,
wherein a cumulative weight of the swinging masses of the dynamic vibration damping system is equal to 0.26% to 0.52% of a building weight.

2. The system according to claim 1, wherein the springs and dampers of the swinging mass are disposed so that their line of action is parallel to the respective swinging plane and there are provided sliding guides which allow a horizontal relative shifting of the mass in relation to a frame of the respective damping unit in two opposing directions.

3. The system according to claim 2, wherein the frame of each of the plurality of damping units is formed of steel.

4. The system according to claim 3, wherein the housing of each of the damping units is located in the one or more façades, and the swinging mass of each of the damping units moves horizontally in opposite directions on the swinging plane parallel to the building façade, wherein the one or more façades includes a spandrel area, and the housings of the damping units are located in the spandrel area of the one or more façades.

5. The system according to claim 1, wherein the bottom of the swinging mass is supported by roller bearings capable of sliding on sliding guides.

6. The system according to claim 1, wherein the housing of each of the damping units is located in the one or more slabs, and the swinging mass of each of the damping units moves horizontally in opposite directions on the swinging plane parallel to the building slab, wherein the one or more slabs comprises a floating floor and the swinging mass of each of the damping units is located horizontally under the floating floor.

7. The system according to claim 1, wherein the swinging mass is made of a steel or concrete block.

8. The system according to claim 1, wherein each swinging mass is provided with a recess to enable addition of weight.

9. The system according to claim 1, wherein the springs are pre-stressed elastomeric shock cords fixed at the opposite sides of the damping unit.

10. A building provided with the dynamic vibration damping system according to claim 1, having a facade or a slab or a partition wall on which there are located a plurality of housings which are each adapted to house one of the plurality of damping units.

11. A building according to claim 10 having a number of housings greater than 50 per floor and a number of floors greater than 25.

* * * * *